United States Patent [19]
Seki et al.

[11] Patent Number: 5,694,389
[45] Date of Patent: Dec. 2, 1997

[54] OFDM TRANSMISSION/RECEPTION SYSTEM AND TRANSMITTING/RECEIVING APPARATUS

[75] Inventors: Takashi Seki; Noboru Taga; Shigeru Okita, all of Yokohama, Japan

[73] Assignee: Kabushiki Kaisha Toshiba, Kawasaki, Japan

[21] Appl. No.: 605,742

[22] Filed: Feb. 22, 1996

[30] Foreign Application Priority Data

Feb. 24, 1995 [JP] Japan ................................. 7-037049

[51] Int. Cl.⁶ ........................................... H04J 11/00
[52] U.S. Cl. ........................................ 370/208; 375/326
[58] Field of Search ........................ 370/19, 20, 21, 370/23, 69.1, 74, 76, 72, 110.2, 100.1, 105.1, 105.2, 208, 209, 320, 335, 342, 441; 375/200, 205, 354, 355, 326–329

[56] References Cited

U.S. PATENT DOCUMENTS

| | | | |
|---|---|---|---|
| 5,343,498 | 8/1994 | Toy et al. | 375/355 |
| 5,506,836 | 4/1996 | Ikeda et al. | 370/19 |
| 5,530,812 | 8/1996 | Philips | 370/19 |

OTHER PUBLICATIONS

Nogami et al, "A Fast Acquisition Technique of Frequency and Timing Period for OFDM Systems", Technical Report of IEICE, RCS94–152 (1995–02), pp. 25–30.

Trip Report and Recommendation Regarding COFDM, submitted by the Task Force on COFDM of the Transmission Expert Group, Jan. 1994.

Hara et al: "System Performance of Multicarrier Modulation in Fading Channels", ITE Technical Report, vol. 18, No. 11, pp. 39–44 (Feb. 1994).

*Primary Examiner*—Douglas W. Olms
*Assistant Examiner*—Ajit Patel
*Attorney, Agent, or Firm*—Cushman Darby & Cushman IP Group of Pillsbury Madison & Sutro LLP

[57] ABSTRACT

This invention improves the frequency acquisition range and the resistance to multipath interference. In a digital signal transmission system using OFDM, on the transmission side, some or all of a plurality of equidistant carrier positions are treated as reference carrier positions. The actual transmitted carriers are arranged in a predetermined pattern non-equidistant to the frequency carrier positions to form an OFDM symbol. This OFDM symbol is periodically transmitted as frequency reference symbols. On the reception side, the carrier arrangement pattern of the frequency reference symbols is detected, a carrier frequency offset is detected from the detected pattern offset, and the carrier frequency is compensated based on the frequency offset.

15 Claims, 13 Drawing Sheets

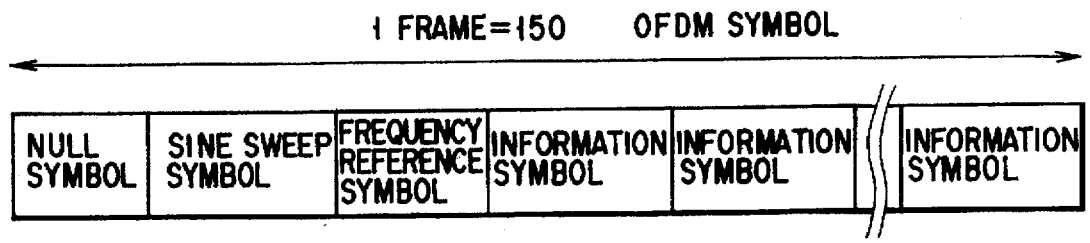
F I G. 1
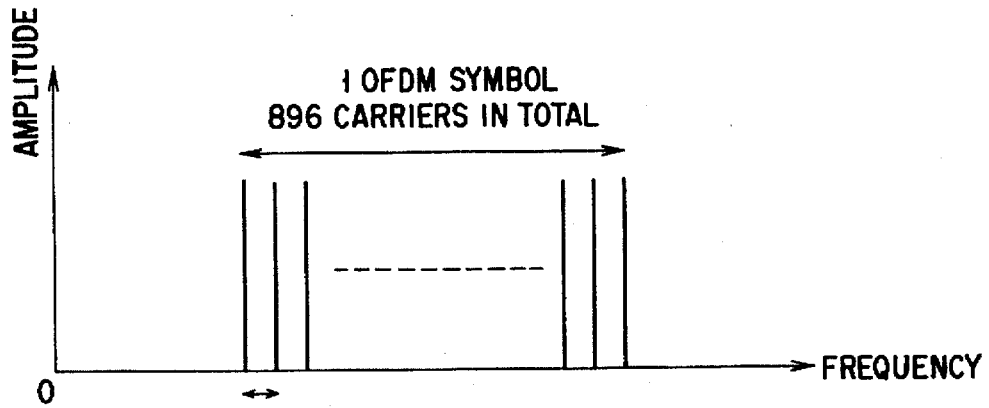
F I G. 2
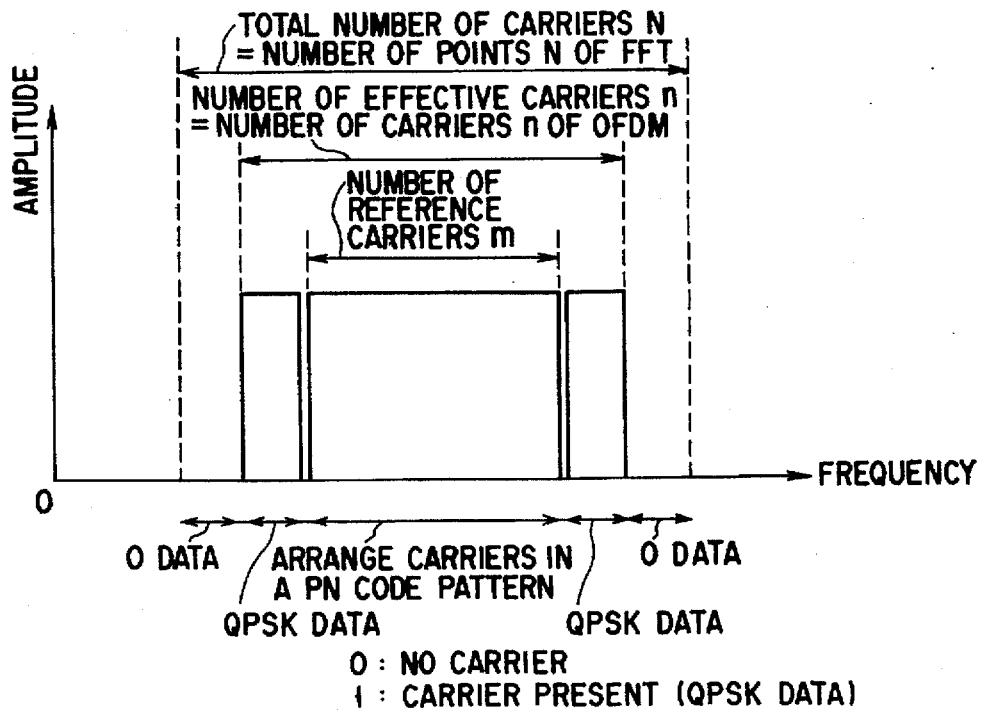
F I G. 3

FIG. 8A INPUT I DATA

FIG. 8B DELAYED I DATA

FIG. 8C CORRELATION COEFFICIENT SII

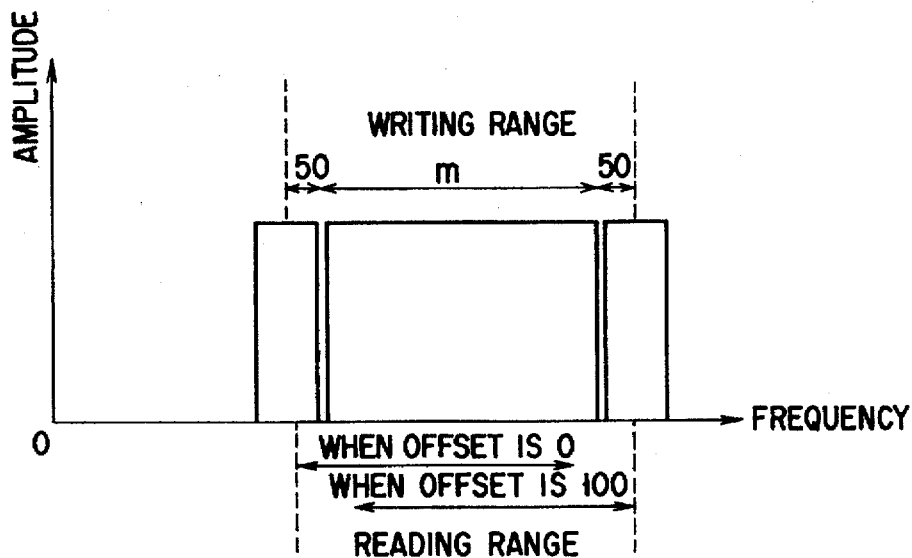
F I G. 9
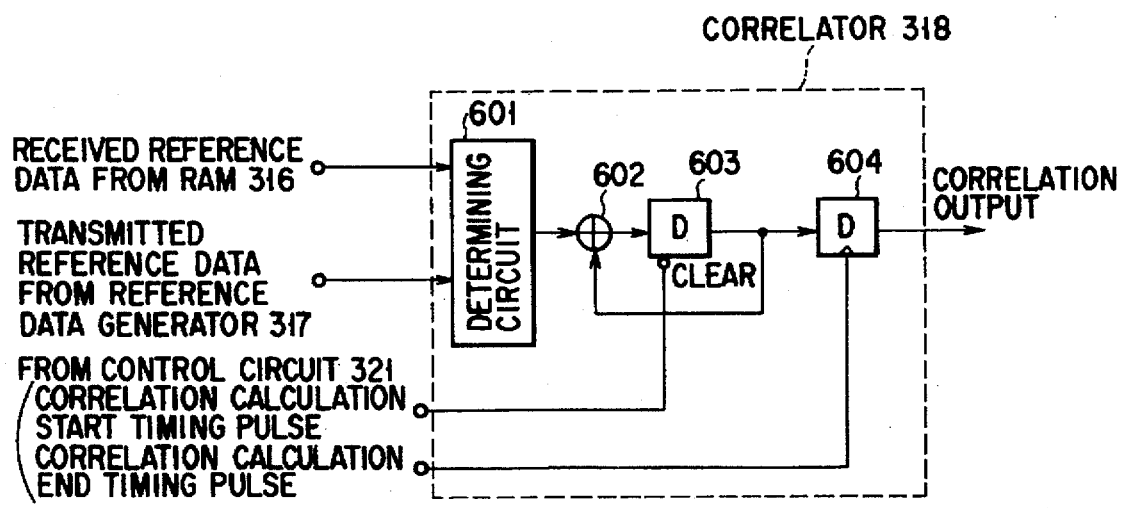
F I G. 10

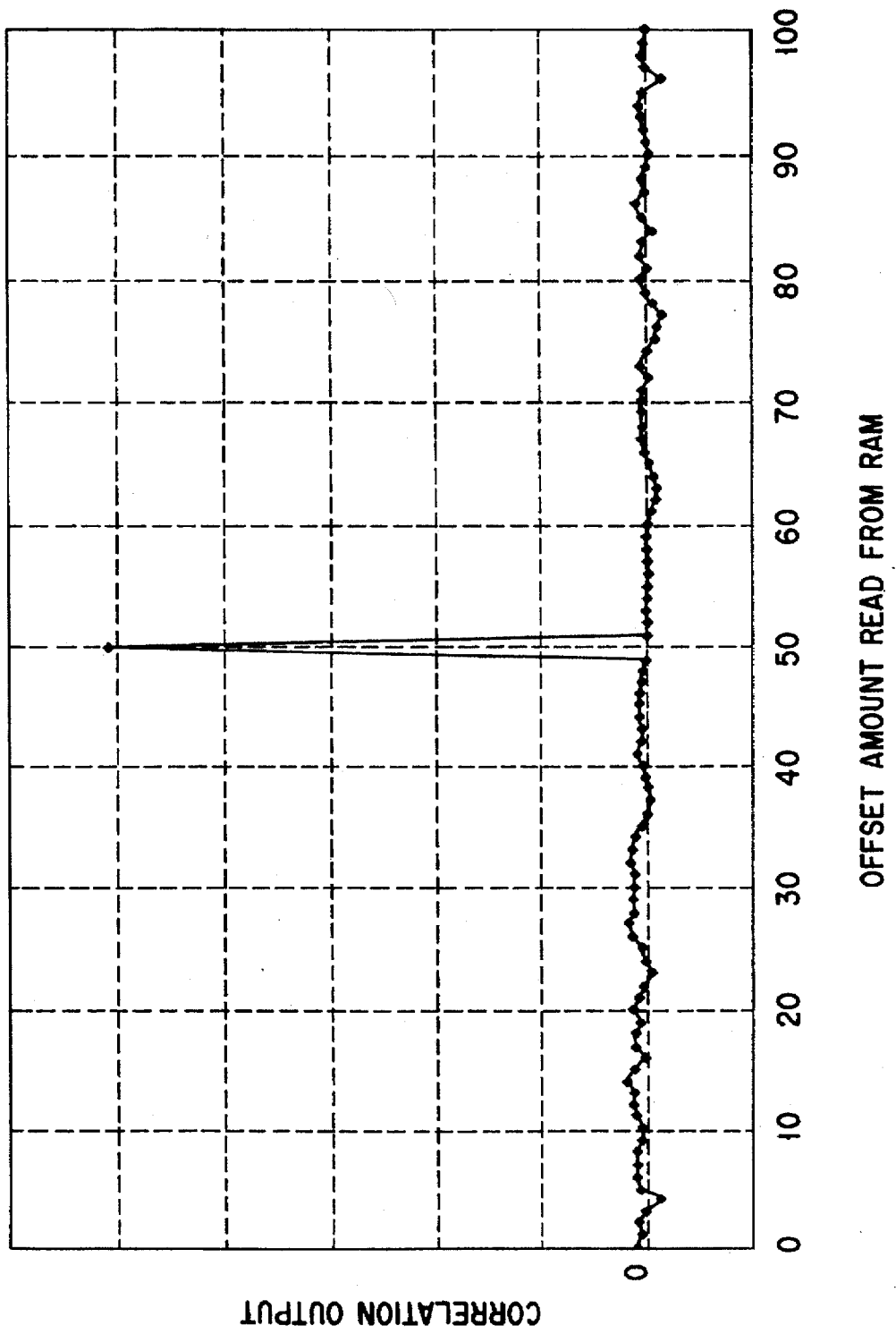
F I G. 11

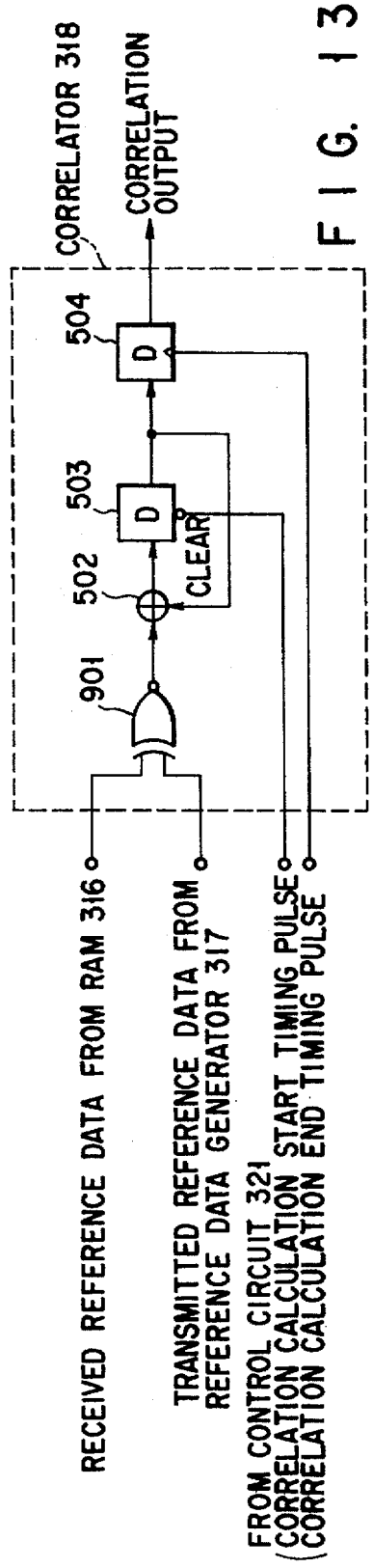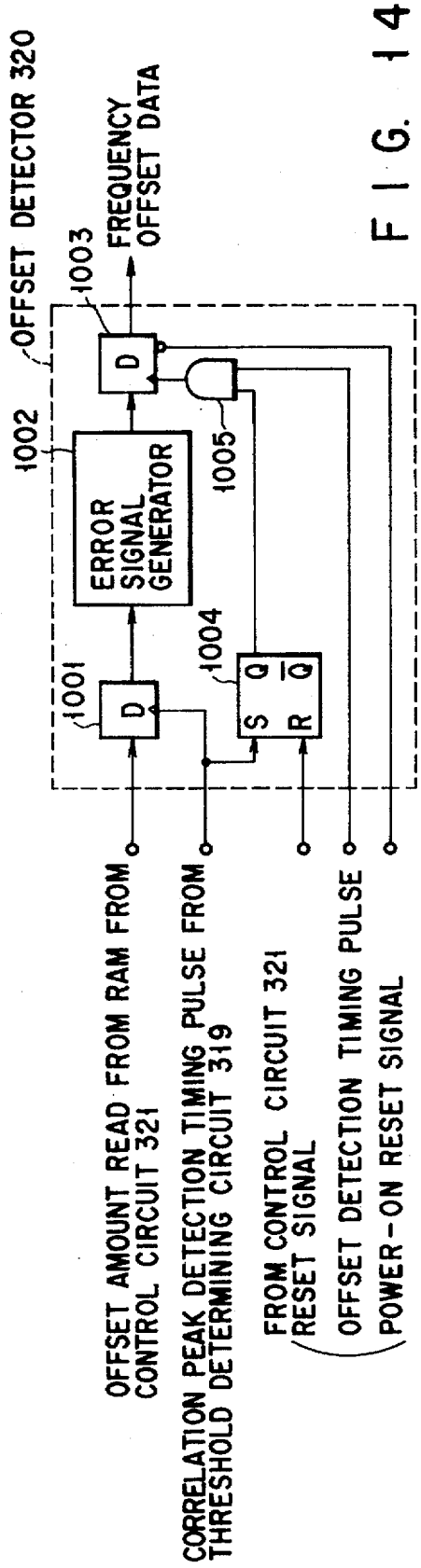

OFDM TRANSMISSION/RECEPTION SYSTEM AND TRANSMITTING/RECEIVING APPARATUS

BACKGROUND OF THE INVENTION

1. Field of the Invention

The present invention relates to transmitting and receiving systems for digital signals using OFDM (Orthogonal Frequency Division Multiplexing) techniques, and transmitting and receiving apparatuses for use in those systems.

2. Description of the Related Art

For transmission of audio signals and video signals, development of digital-modulation based transmission systems has recently become very active. In digital terrestrial broadcasting, in particular, OFDM has been receiving a great attention because of its features such as the robustness against multipath interference and higher efficiency of the frequency usage.

In OFDM, a transmission frame is formed by a plurality of OFDM symbols and a frequency reference symbol is transmitted frame by frame. The frequency reference symbol is used to control the frequency of the local oscillator (LO) in a receiving apparatus. It is therefore desirable that the frequency reference symbol be robust to multipath interference. When the frequency reference symbol receives multipath interference, the frequency of the LO are disturbed. It is also desirable that the frequency offset of the LO should be able to detect finely by the frequency reference symbol.

SUMMARY OF THE INVENTION

Accordingly, it is an object of the present invention to provide an OFDM transmission/reception system and transmitting and receiving apparatuses which can transmit a frequency reference symbol having carriers assigned in a predetermined non-equidistant pattern on the transmission side, and can detect the frequency offset of the LO on the reception side based on an offset of a carrier arrangement pattern on the reception side, thereby allowing the frequency acquisition range to be widened and improving the resistance to multipath interference.

To achieve the above object, according to one aspect of this invention, there is provided an orthogonal frequency division multiplexing (OFDM) transmission/reception system. The a transmission side includes means for:

setting some or all of a plurality of equidistant carrier positions as reference carrier positions;

assigning actual transmitted carriers on the reference carrier positions in a predetermined arrangement pattern to yield an OFDM symbol; and periodically transmitting the OFDM symbol as frequency reference symbols;

The reception side includes means for:

detecting the frequency reference symbols as a carrier reception pattern;

detecting a frequency offset of the LO based on a difference of the carrier pattern between the reception side and the transmission side; and compensating for frequency of the LO in accordance with the frequency offset.

Carrier positions for frequency reference symbols are not arranged at equal intervals so that the frequency reference symbols are prevented from being attenuated by the periodic attenuation along the frequency axis caused by multipath interference. In detecting the offset of the arrangement pattern of the received carriers, the offset amount of the carrier arrangement pattern can finely detected whether it is large or small, so that the frequency acquisition range can easily be increased. This system can therefore be robust to multipath interference and can widen the carrier frequency acquisition range of the receiver.

According to another aspect of this invention, there is provided an OFDM transmitting apparatus comprising:

reference symbol generating means for generating data for frequency reference symbols corresponding to non-equidistant positions among carrier positions assigned at equidistances along a frequency axis;

multiplexing means for multiplexing at least data for the frequency reference symbols and data for a main information symbol;

OFDM modulation means for performing OFDM modulation on a plurality of carriers with an output of the multiplexing means; and quadrature modulation means for performing orthogonal modulation on an output of the OFDM modulation means.

In the transmitting apparatus, the reference symbol generating generates data for frequency reference symbols in a predetermined non-equidistant pattern. The multiplexing means multiplexes the data for the frequency reference symbols, data for an information symbol and data for other reference symbols. The OFDM modulation means performs OFDM modulation on the output of the multiplexing means, and the quadrature modulation means performs orthogonal modulation on the output of the OFDM modulation means. Accordingly, the frequency reference symbol is periodically transmitted. Because the carrier pattern of the frequency reference symbols are not equidistant, it is possible to prevent the frequency reference symbols from being attenuated by the periodic attenuation caused by multipath interference.

According to a further aspect of this invention, there is provided an OFDM receiving apparatus comprising:

carrier generating means for quadrature demodulation means;

quadrature demodulation means for receiving an OFDM signal including a frequency reference symbol and performing quadrature demodulation of the OFDM signal with the output of the carrier generating means;

OFDM demodulation means for performing OFDM demodulation using an output of the quadrature demodulation means;

first frequency control means for detecting a carrier frequency offset using the output of the quadrature demodulation means and supplying a first compensation signal based on the frequency offset to the carrier generating means; and second frequency control means for detecting a carrier arrangement pattern of transmitted carriers using an OFDM demodulation output of the frequency reference symbol, comparing the detected carrier arrangement pattern with a predetermined carrier arrangement pattern to detect a carrier frequency offset and supplying a second carrier compensation signal based on that frequency offset to the carrier generating means.

On the receiving side, the quadrature demodulation means performs quadrature demodulation on an OFDM signal including a frequency reference symbol using the output of the carrier generating means. The OFDM demodulation means performs OFDM demodulation on the output of the quadrature demodulation means. The first frequency control means detects a carrier frequency offset using the output of the quadrature demodulation means and compensates the frequency offset. The second frequency control means detects a carrier arrangement pattern from the OFDM demodulation output of the frequency reference symbol, compares the detected carrier arrangement pattern with a predetermined carrier arrangement pattern to detect a carrier frequency offset and compensates the frequency offset. The first frequency control means operates to compensate for an frequency offset within ±½ of the carrier spacing, and the second frequency control means operates to compensate for an frequency offset which is an integer multiple of the carrier spacing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing the structure of a transmission frame in an OFDM transmission system;

FIG. 2 is a diagram exemplifying the arrangement of frequency reference symbols in the OFDM transmission system;

FIG. 3 is a diagram for explaining an OFDM transmission system according to one embodiment of this invention;

FIG. 8A is a diagram showing input I data of an OFDM modulation wave to be input the first AFC circuit 310;

FIG. 8B is a diagram showing delayed I data of an OFDM modulation wave to be input the first AFC circuit 310;

FIG. 8C is a diagram showing a correlation coefficient SII to be output from a correlation calculator in FIG. 6;

FIG. 9 is a diagram for explaining the operation of a RAM 316 in FIG. 5;

FIG. 10 is a diagram showing one embodiment of a correlator 318 in FIG. 5;

FIG. 11 is a diagram for explaining the operation of the correlator 318 in FIG. 5;

FIG. 13 is a diagram showing another embodiment of the correlator 318 in FIG. 5;

FIG. 14 is a diagram showing the structure of an offset detector 320;

DETAILED DESCRIPTION OF THE PREFERRED EMBODIMENTS

Figure 4:
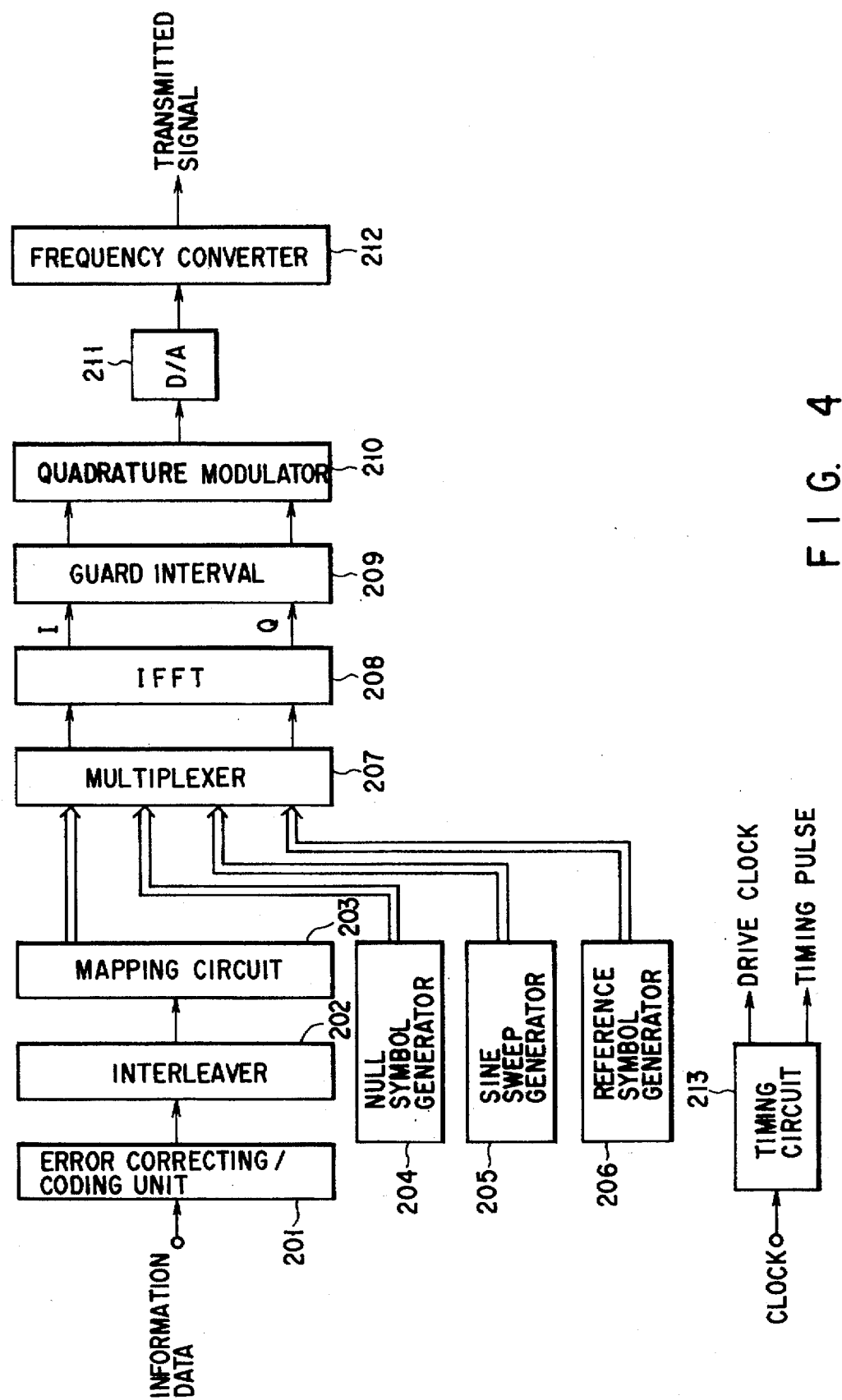
FIG. 4 is a diagram showing one embodiment of an OFDM transmitting apparatus according to this invention.

Preferred embodiments of the present invention will now be described with reference to the accompanying drawings.

FIGS. 1 and 2 are diagrams presented for explaining the techniques on which this invention is premised. FIG. 1 shows the structure of one frame in the OFDM transmission format, and FIG. 2 shows an example of a frequency reference carrier.

One frame in FIG. 1 consists of, for example, 150 OFDM symbols each having 869 carriers, for example.

The first OFDM symbol from the head of the frame is a null symbol for the synchronization of reception, the second OFDM symbol is a sine sweep symbol, the third OFDM symbol is a frequency reference symbol, and the fourth and subsequent OFDM symbols are information symbols. The null symbol and sine sweep symbol are used for timing synchronization and equalization reference signals in a receiver. The frequency reference symbol is used to detect the frequency offset in a receiver.

FIG. 2 exemplifies the structure of the frequency reference symbol.

This structure of the frequency reference symbol has a carrier present every 16-carrier position among 869 carrier positions, and has no carriers present at the other carrier positions. The decoder detects the carrier frequency offset based on an offset of the position of decoded data of the frequency reference symbol. It is therefore possible to control the carrier frequency offset with the resolution of ±7 carrier position intervals.

This OFDM transmission system however has the following shortcomings. First, since a frequency reference symbol having carriers located every other 16 carrier positions is used, the frequency-offset acquisition range is limited to the interval of ±7 carrier positions.

As the carriers are arranged equidistant, they are susceptible to multipath interference. In a multipath, an amplitude drop occurs at a specific frequency by the interference between a direct wave and an echo. In a transmission channel where a direct wave and a single echo are present, amplitude attenuation occurs at periodic frequency intervals. When the position of the attenuation (drop) of this transmission performance coincides with the position of an existing carrier in the frequency reference symbol, all the carriers of the frequency reference symbol are interfered, thus disabling the frequency acquisition.

In view of those problems, this invention provides an OFDM transmission system which will be discussed below.

FIG. 3 shows the spectrum of a frequency reference symbol in an OFDM transmission system according to one embodiment of this invention. Referring to FIG. 3, one OFDM symbol consists of N carrier positions among which n carrier positions are effective carrier positions. Of the effective carrier positions, middle m carrier positions are frequency reference carrier positions for frequency references.

With respect to the m frequency reference carrier positions, carries are arranged in a pattern of an M sequence, for example, by using this M sequence as a PN (Pseudo Noise) code. More specifically, no carries are present when the code is "0" and carries are present when the code is "1."

With regard to the other carriers than the frequency reference carrier positions (the sections indicated as QPSK symbols on both sides of the frequency reference carrier positions in FIG. 3) and the carriers corresponding to the code of "1" (the existing carriers at positions among the reference carrier positions m), random QPSK data, for example, is transmitted using those carriers. This is because this approach is effective in making the amplitudes of the individual carriers constant and making the individual carriers to have random phases.

The constant amplitudes are ensured to allow the receiver to acquire the amplitudes of the frequency reference symbols to detect the carrier arrangement pattern. The phases of the individual carries are set at random here because if the carriers are in phase, the modulation waveform has a high peak which makes signal transmission difficult. The randomness of the phases of the individual carriers means to prevent the carriers from being in phase with one another, and the transmission of QPSK data is effective in accomplishing the random phases. The data transmission efficiency can be improved even when independent data having a significance is used as the QPSK data.

As shown in FIG. 3, the presence/absence of carriers on the frequency axis is determined by a PN code, a QPSK symbol is assigned to an existing carrier and IFFT (Inverse Fast Fourier Transform) is performed on signals at N points, so that the time waveform of the frequency reference symbols is formed.

Although FIG. 3 shows a frequency reference symbol having carriers arranged in a PN sequence pattern, it is not limited to this particular type but a frequency reference symbol which has carriers arranged in a predetermined non-equidistant pattern may be used as well. Although the middle m carrier positions are used for reference carriers, the other carrier positions or all the carrier positions may be used to arrange the reference carriers. Further, another PSK symbol may be used as the transmission symbol.

FIG. 4 shows one embodiment of an OFDM transmitting apparatus according to this invention.

In FIG. 4, main data is encoded by an error correcting/ coding unit 201 whose coded output is interleaved to reduce the influence of an burst error by an interleaver 202. The output of this interleaver 202 is supplied to a mapping circuit 203. The mapping circuit 203 converts input data to complex data which represents, for example, a QAM symbol and sends it to a multiplexer 207 as information symbol data. A null symbol generator 204 generates 0 data for generating a null symbol and supplies it to the multiplexer 207. A sine sweep generator 205 generates sine data for generating a sine sweep signal, and sends it to the multiplexer 207. A frequency reference symbol generator 206 generates data for the reference symbols that have already been discussed with reference to FIG. 3, and sends the data to the multiplexer 207.

The multiplexer 207 multiplexes the individual inputs in the order of the null symbol, sine sweep symbol, frequency reference symbol and information symbol to produce a transmission frame. The output of the multiplexer 207 is supplied to an IFFT circuit 208, which performs IFFT to generate the real component and imaginary component of the base-band OFDM modulation wave. The output of the IFFT circuit 208 is supplied to a guard interval adding circuit 209, which copies the rear portion of a single OFDM symbol to the front of the symbol as a guard interval in order to reduce the influence of multipath interference. The output of this adding circuit 209 is subjected to quadrature modulation by a carrier with a predetermined frequency in an quadrature modulator 210. The modulated output is converted to an analog signal by a D/A (Digital to Analog) converter 211. The output of the D/A converter 211 is frequency-converted to an RF signal by a frequency converter 212 before transmission. A clock is input to a timing circuit 213, which produces drive clocks and timing pulses to the individual circuits.

Figure 5:
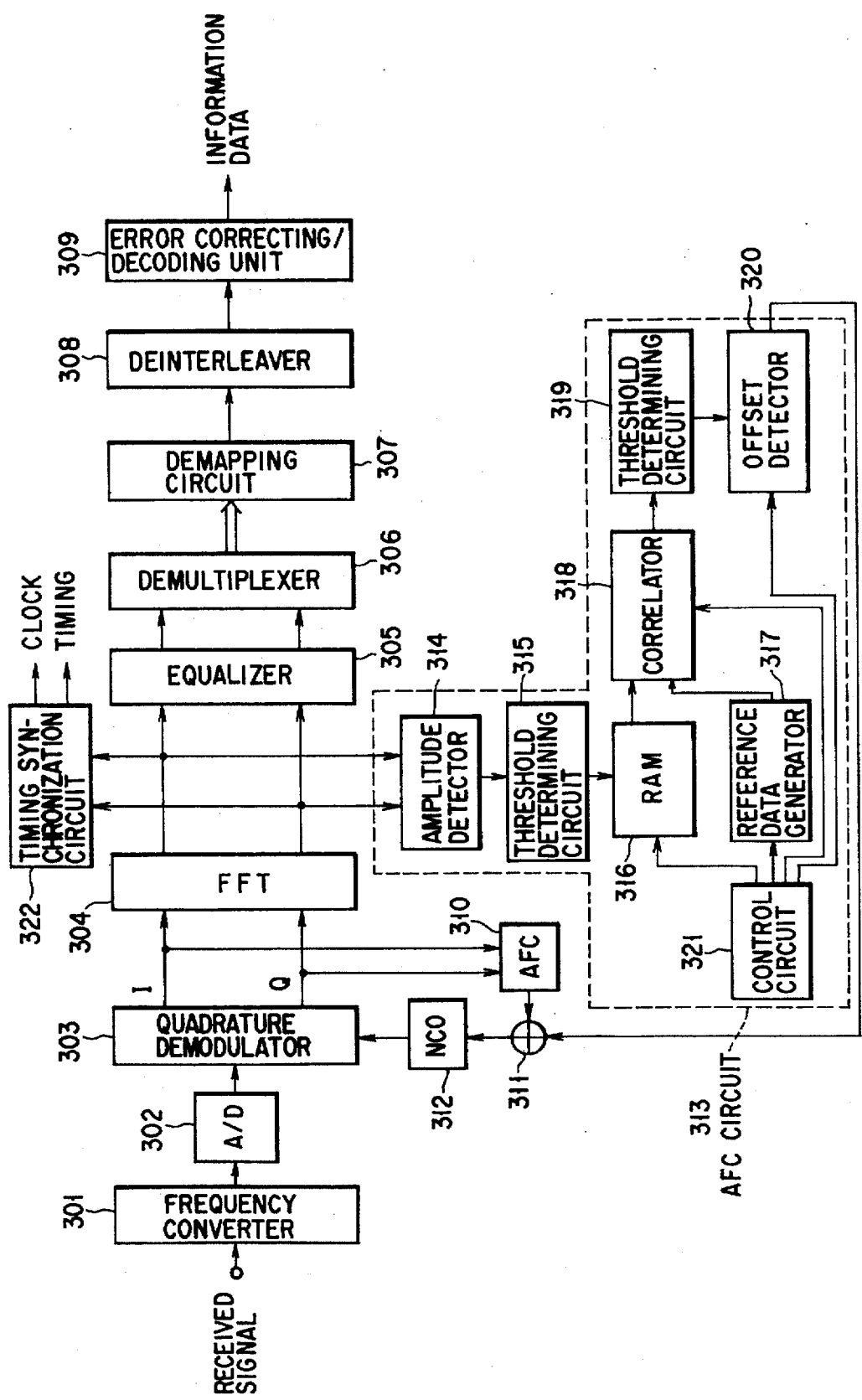
FIG. 5 is a diagram showing one embodiment of an OFDM receiving apparatus according to this invention.

FIG. 5 shows one embodiment of an OFDM receiving apparatus according to this invention. A frequency difference of OFDM modulation wave between a transmitter and a receiver is caused by an analog local oscillator in a frequency converter 301. In this embodiment, the frequency difference above is eliminated by controlling of a detection frequency at a quadrature demodulator 303.

In FIG. 5, after a received signal is converted to have a predetermined frequency by the frequency converter 301, the converted signal is converted by an A/D (Analog to Digital) converter 302 to a digital signal which is in turn input to the quadrature demodulator 303. The quadrature demodulator 303 performs quadrature detection using carrier from a numerical control oscillator (NCO) 312 and outputs a base-band OFDM modulation wave. The output (I signal) along the in-phase detection axis and the output (Q signal) of the quadrature detection axis of the quadrature demodulator 303 are the real component and imaginary component of the OFDM modulation wave, respectively. The I signal and Q signal are input to an FFT circuit 304. The FFT circuit 304 performs FFT on the received OFDM modulation wave. The output of the FFT circuit 304 is complex data representing the amplitude and phase of each carrier and multipath-originated amplitude and phase offsets are corrected by an equalizer 305.

An information symbol is separated from the output of the equalizer 305 by a demultiplexer 306 and the resultant data is supplied to a demapping circuit 307. The demapping circuit 307 decodes the received complex symbol data. The output of the demapping circuit 307 is deinterleaved by a deinterleaver 308 to reduce the influence caused by a burst error, and the deinterleaved data is decoded by an error correcting/ decoding unit 309. The decoded data is output as main data.

The output of the quadrature demodulator 303 is also supplied to a first AFC (Automatic Frequency Control) circuit 310. The AFC circuit 310 detects the carrier (LO carrier) frequency offset from the output of the quadrature demodulator 303 and generates a signal for compensating for this frequency offset. The output of the first AFC circuit 310 is supplied via an adder 311 to the NCO 312 so that the frequency of the LO carrier are controlled.

Through the above-described AFC loop, it is possible to accomplish frequency acquisition at stable points within ±½ of the adjoining carrier (OFDM carrier) spacing frequency (fs).

The output of the FFT circuit 304 is also input to a second AFC circuit 313. The second AFC circuit 313 initiates its operation after the first AFC circuit 310 finishes the frequency acquisition. After the completion of frequency acquisition by the first AFC circuit 310, there remains a frequency offset of an integer multiple of the OFDM carrier spacing. When a frequency offset of 10 fs, for example, is present at this time, the output of the FFT circuit 304 is shifted by 10 samples.

Using the frequency reference symbol shown in FIG. 3, therefore, the second AFC circuit 313 detects an offset in received data to detect a carrier frequency offset in the units of fs.

In the second AFC circuit 313, the I data and Q data of the received symbol from the FFT circuit 304 are input to an amplitude detector 314 which detects the amplitude of the symbol. A threshold determining circuit 315 compares the output of the amplitude detector 314 with a predetermined threshold value, and outputs "0" when the symbol amplitude is smaller than the threshold value and outputs "1" when the former is equal to or greater than the latter. This is because that the frequency reference symbol has no carrier when the code is "0" and has a carrier when the code is "1."

The output of the threshold determining circuit 315 is supplied to a RAM 316 where the result of the determination of the frequency reference symbol (no carriers when it is "0" and the presence of a carrier when it is "1") is written in response to a write control signal from a control circuit 321. The carrier arrangement pattern of the received frequency reference symbol is output to a correlator 318 from the RAM 316 in response to a read control signal from the control circuit 312. The correlator 318 is controlled by a control signal from the control circuit 321 to acquire the correlation between the reception pattern and transmission pattern. The output of the correlator 318 indicates a peak when the reception pattern matches with the transmission pattern.

When the output of the correlator 318 is equal to or greater than a predetermined threshold value, a threshold determining circuit 319 outputs "1" and detects the timing which indicates the peak correlation output. An offset detector 320 detects the difference between the reception pattern and transmission pattern from the output of the threshold determining circuit 319 and the signal from the control circuit 321, and generates a signal to compensate for the frequency offset of reproduction carriers in the units of fs. The output of the offset detector 320 is supplied to the adder 311 as the output of the second AFC circuit 313. The output of the first AFC circuit 310 is also supplied to the adder 311 from which the addition result is output to the NCO 312. Accordingly, the oscillation frequency of the NCO 312 is controlled to accomplish the carrier frequency synchronization.

The output of the quadrature demodulator 303 is supplied to a timing synchronization circuit 322 which generates clocks and timing pulses to the individual circuits.

Figure 6:
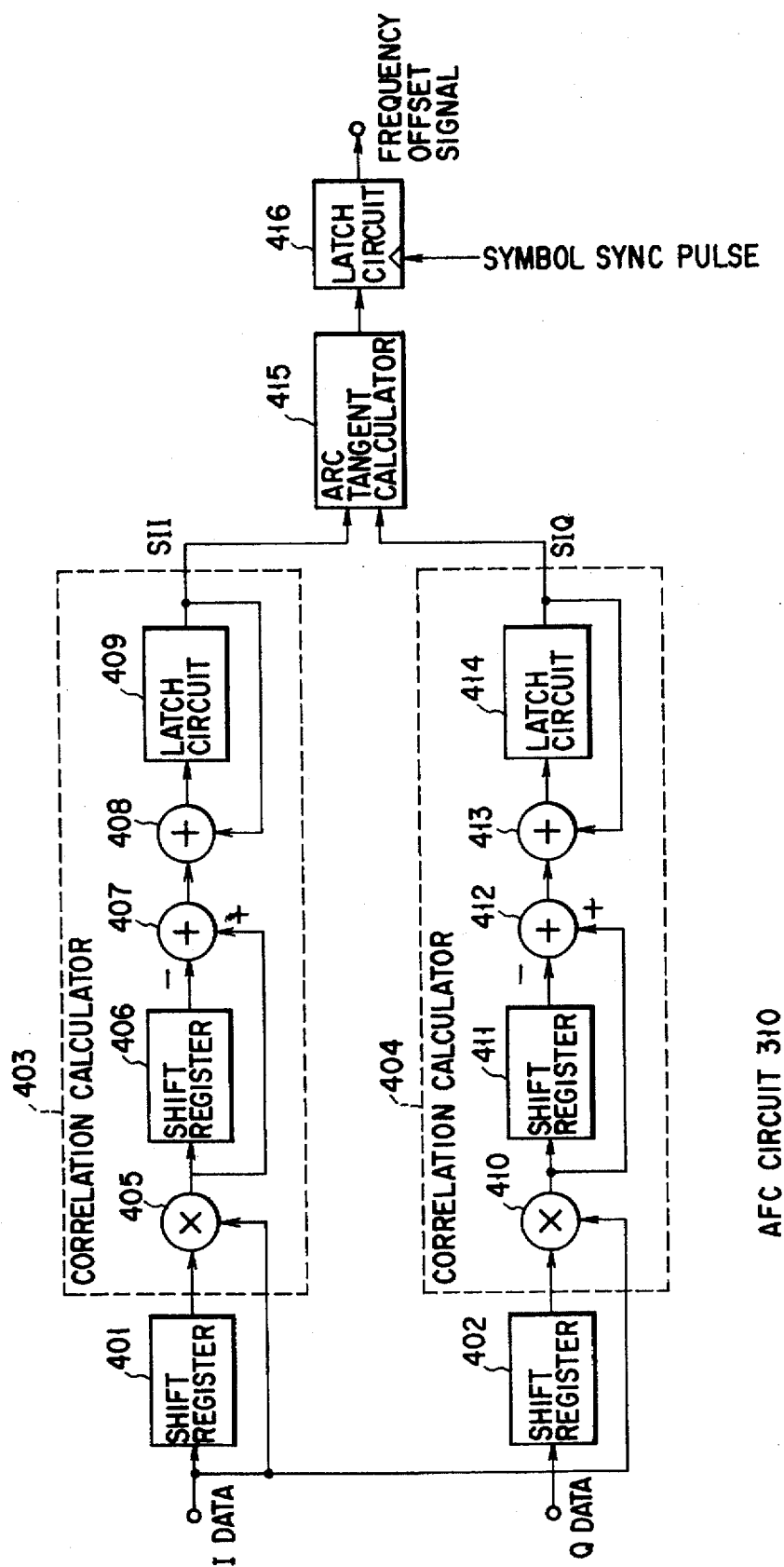
FIG. 6 is a diagram showing one embodiment of a first AFC circuit 310 in FIG. 5.

FIG. 6 exemplifies the specific structure of the first AFC circuit 310.

Figure 7:
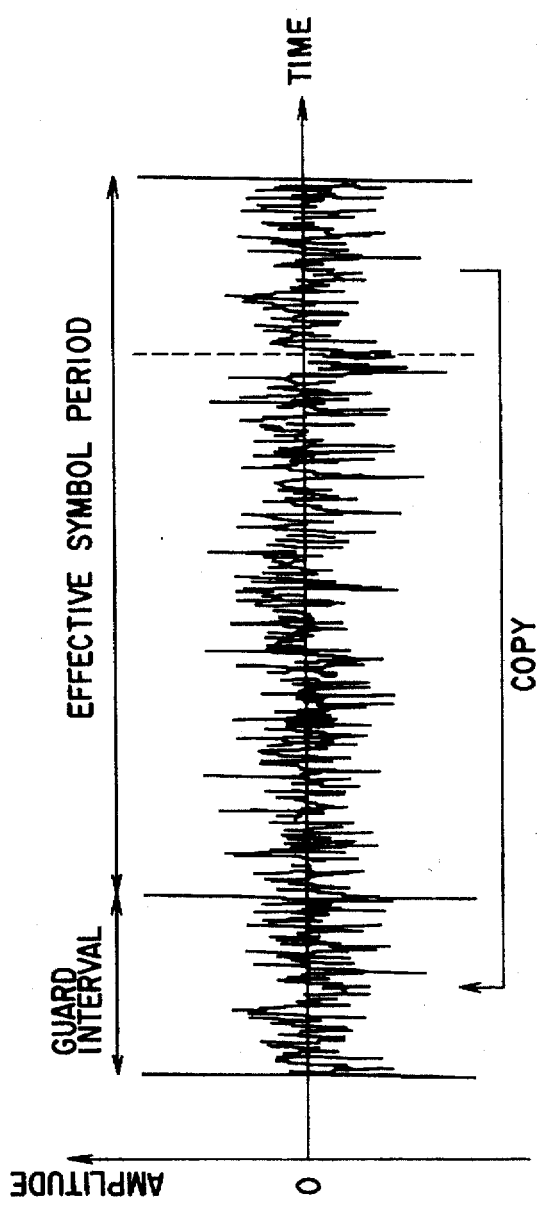
FIG. 7 is a diagram showing an OFDM modulation wave to which a guard interval is added.

FIG. 7 shows the I data of a base-band OFDM modulation wave. The OFDM modulation wave has a waveform close to that of random noise. The OFDM modulation wave is added with a guard interval by copying a part of the second half of an effective symbol to the front of that symbol.

In FIG. 6, the input I data and input Q data of the base-band OFDM modulation wave, which are outputs of the quadrature demodulator 303, are respective input to shift registers 401 and 402. The shift registers 401 and 402 respectively delay the I data and Q data by the effective symbol length of the OFDM symbol. The input I data and the delayed I data output from the shift register 401 are supplied to a correlation calculator 403. In the correlation calculator 403, the two input signals are multiplied by a multiplier 405. The output of the multiplier 405 is input to a shift register 406 to be delayed by the guard interval of the OFDM symbol. The difference between the output of the multiplier 405 and the output of the shift register 406 is obtained by a subtracter 407. The output of this subtracter 407 is accumulated by an adder 408 and a latch circuit 409. As a result, the average movement of the result of multiplying in the guard interval is acquired.

The above-described correlation calculator 403 detects a correlation coefficient (SII) indicating the correlation between the input I data and the delayed I data.

The input I data and the delayed Q data output from the shift register 402 are supplied to a correlation calculator 404, which detects a correlation coefficient (SIQ) indicating the correlation between the input I data and the delayed Q data in a similar manner. The correlation calculator 404 has a multiplier 410, a shift register 411, a subtracter 412, an adder 413 and a latch circuit 414.

The outputs of the correlation calculators 403 and 404 are input to an arc tangent ($\tan^{-1}$) calculator 415 which detects $\tan^{-1}$ (SIQ/SII). The output of the $\tan^{-1}$ calculator 415 is input to a latch circuit 416, which latches a value at the boundary between symbols by symbol timing and outputs the resultant signal as a carrier frequency offset signal.

The operation of the first AFC circuit 310 will now be described specifically.

FIG. 7 shows the I data of a base-band OFDM modulation wave. The OFDM modulation wave has a waveform close to that of random noise. The OFDM modulation wave is added with a guard interval by copying a part of the second half of an effective symbol to the front of that symbol.

FIGS. 8A through 8C present timing charts illustrating the operation of the first AFC circuit 310. FIG. 8A shows the input I data, FIG. 8B shows the output (delayed I data) of the shift register 401, and FIG. 8C shows the correlation coefficient SII from the correlation calculator 403. An OFDM modulation wave has guard intervals G1, G2 and so forth affixed to the heads of individual effective symbols S1, S2 and so forth. The guard intervals G1, G2 and so forth are obtained by copying tail periods G1', G2' and so forth of the effective symbols S1, S2 and so forth (see FIG. 7). If the input I data is delayed by the effective symbol period, therefore, the timings of the guard intervals G1, G2 and so forth of the delayed I S data respectively coincide with the tail periods G1', G2' and so forth of the input I data, as shown in FIGS. 8A and 8B.

A signal in the guard interval is the copy of a signal in the associated tail period, the correlation between the input I data and the delayed I data is high in this period. In the other periods, however, the correlation between the input I data and the delayed I data is low because the I data is a noise-like signal as shown in FIG. 7. Accordingly, the correlation coefficient SII gradually increases from the start timings of the tail periods G1', G2' and so forth and becomes a peak at the end timings of the tail periods (the boundary between OFDM symbols) as shown in FIG. 8C.

Since the I data and Q data are signals whose phases are shifted 90 degrees from each other on the complex plane and do not have a correlation, the correlation coefficient SIQ between the input I data and the delayed Q data takes a value in the vicinity of "0".

While FIG. 8C shows the correlation coefficient SII when the carrier synchronization is achieved, the correlation coefficient does not become high in the tail period when the carrier synchronization is not achieved. In the case where the frequency offset Δf of reproduction carriers is fs/4 (fs: the frequency difference between adjoining carriers), for example, the phase is shifted 90 degrees in the effective symbol period so that the phase of the signal in the period G' leads the phase of the signal in the period G by 90 degrees. In this case, therefore, the correlation coefficient SII becomes a value close to "0" and the correlation coefficient SIQ has a negative peak at the end timing of the tail period.

Therefore, the correlation coefficients SII and SIQ at the guard timing are functions of the frequency offset $\Delta f$ of reproduction carriers and the arc tangent of SIQ/SII becomes a signal which zero-crosses at the positions of integer multiples of fs. The frequency offset signal can therefore be acquired by supplying $\tan^{-1}$ (SIQ/SII), the output of the $\tan^{-1}$ calculator 415, to the latch circuit 416 and latching a value at the boundary between symbols by symbol timing (guard timing).

Returning to FIG. 5, the operations of the individual sections of the AFC circuit 313 will specifically be described below.

To begin with, the general operation of the AFC circuit 313 will be discussed briefly. The I data and Q data output from the FFT circuit 304 are input to the amplitude detector 314 which detects the amplitude of the symbol. The threshold determining circuit 315 compares the output of the amplitude detector 314 with a predetermined threshold value, and outputs "0" when the symbol amplitude is smaller than the threshold value and outputs "1" when the former is equal to or greater than the latter. The output of the threshold determining circuit 315 is supplied to the RAM 316 where the result of the determination of the frequency reference symbol (no carriers when it is "0" and the presence of a carrier when it is "1") is written in response to the write control signal from the control circuit 321. The carrier arrangement pattern of the received frequency reference symbol is output to the correlator 318 from the RAM 316 in response to the read control signal from the control circuit 312. The correlator 318 is controlled by the control signal from the control circuit 321 to acquire the correlation between the reception pattern and transmission pattern. The output of the correlator 318 indicates a peak when the reception pattern coincides with the transmission patter. When the output of the correlator 318 is equal to or greater than a predetermined threshold value, the threshold determining circuit 319 outputs "1" and detects the timing which indicates the peak correlation output. The offset detector 320 detects the difference between the reception pattern and transmission pattern from the output of the threshold determining circuit 319 and the signal from the control circuit 321, and generates a signal to compensate for the carrier frequency offset in the units of fs. The output of the offset detector 320 is supplied to the adder 311 as the output of the second AFC circuit 313.

FIG. 9 is a diagram for explaining the writing operation and reading operation to the RAM 316. As shown in FIG. 9, the middle m samples in the received reference data sequence and several tens of samples around the m samples are written in the RAM 316. This writing is determined by the expected frequency acquisition range, which is set to ±50 fs in the example of FIG. 9. Next, consecutive m data are read from the RAM 316 and are subjected to the computation of the correlation with a reference PN sequence by the correlator 318. This calculation is repeated while offsetting the reading position as shown in FIG. 9.

FIG. 10 shows the specific structure of the correlator 318 (FIG. 5).

In FIG. 10, the reference data received from the RAM 316 is supplied to a determining circuit 601 which also receives reference data sent from a reference data generator 317. The determining circuit 601 outputs "1" when two input data match with each other and outputs "−1" when both do not match with each other. The output of the determining circuit 601 is supplied to an adder 602. The adder 602 and a latch circuit 603 add the output of the determining circuit 601 m times, and the addition result is output via a latch circuit 604. A correlation calculation start timing signal is supplied to the clear terminal of the latch circuit 603 from the control circuit 321 to clear the output of the latch circuit 603 to "0" when correlation calculation starts. A correlation calculation end timing signal is supplied to the clock terminal of the latch circuit 604 from the control circuit 321 so that the output of the latch circuit 603 is latched in the latch circuit 604 when m pieces of data are added. The above computation is repeated while shifting the reading position in the RAM 316 to detect the correction between the received reference data sequence and the transmitted reference data sequence.

FIG. 11 illustrates the output of the correlator 318 when the reference data is an M sequence with a length of 1023 and the carrier frequency offset is "0." The horizontal scale in FIG. 11 represents the amount of the offset of the reading position in the RAM 316. Because the M sequence has a high self-correlation, the correlation output shows a high peak when the reception pattern matches with the transmission pattern (the offset amount of 50) as shown in FIG. 11. As the length m of the sequence of reference data increases, the correlation peak becomes higher and the system is less influenced by noise, multipath interference or the like. Thus, the length m of the sequence of reference data is determined by the conditions or the like of the transmission channel in use.

Figure 12:
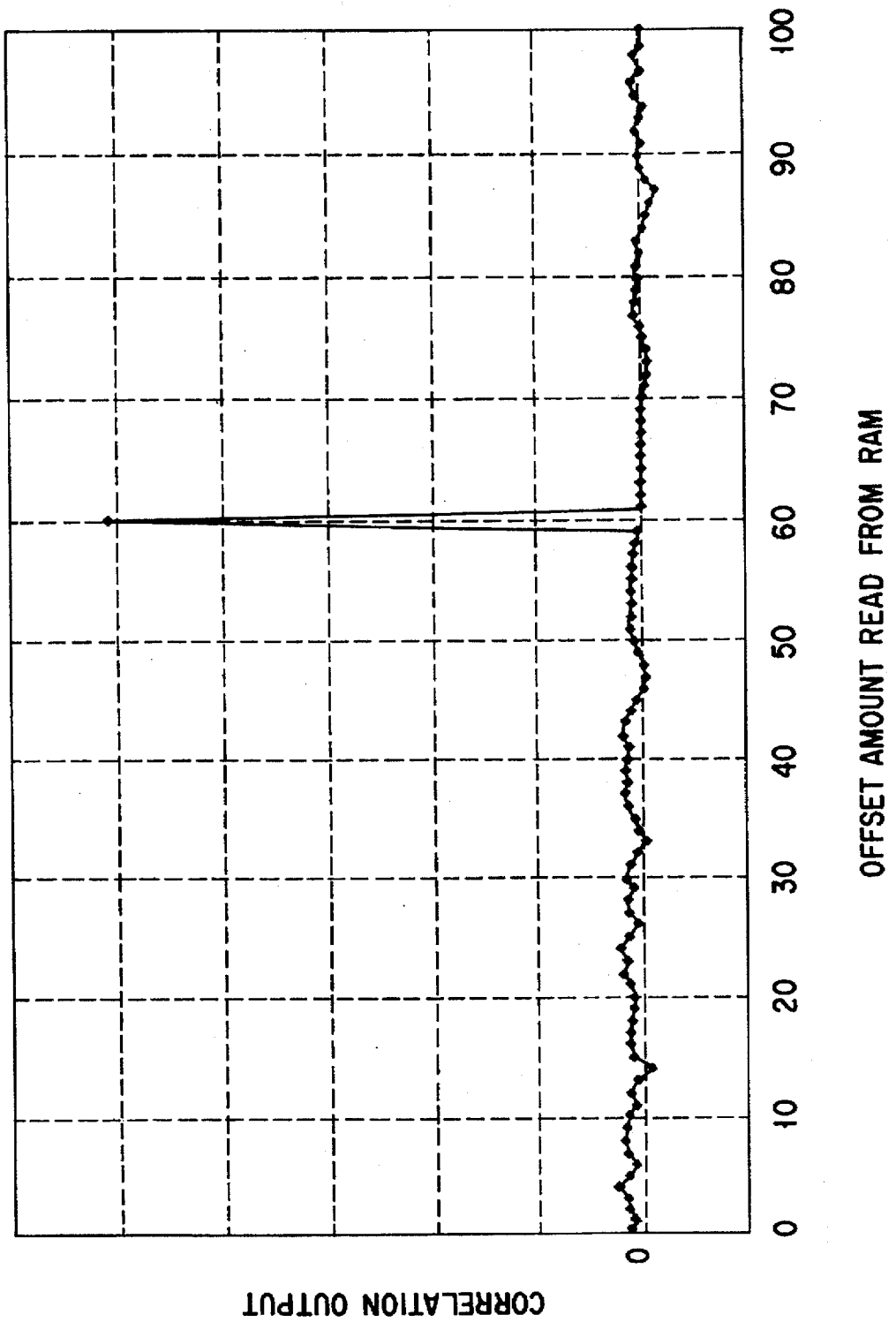
FIG. 12 is a diagram for also explaining the operation of the correlator 318.

FIG. 12 shows the output of the correlator 318 when the carrier frequency offset is ±10 fs. When the carrier frequency offset is ±10 fs, the output of the FFT circuit 304 is shifted by +10 samples along the frequency axis. The timing at which the correlation output shows a peak in FIG. 12 is shifted by +10 samples from the timing in FIG. 11. Therefore, an frequency offset in the units of fs can be known by detecting the offset of the timing at which the correlation output shows a peak. This offset is detected by the offset detector 320.

FIG. 13 shows another embodiment of the correlator 318.

The correlator in FIG. 13 differs from the one in FIG. 10 in that the determining circuit 601 in FIG. 10 is replaced with an exclusive NOR (EX•NOR) gate 901. The other structure is the same as the correlator in FIG. 10. The EX•NOR gate 901 outputs "1" when two input data (received reference data and transmitted reference data) match with each other, and outputs "0" when there is no match. From this output of the EX•NOR gate 901, the correlation between the received reference data sequence and transmitted reference data sequence can be detected in the same manner as done in the circuit in FIG. 10.

FIG. 14 exemplifies the specific structure of the offset detector 320 shown in FIG. 5.

Referring to FIG. 14, the offset amount read from the RAM 316 is supplied to a latch circuit 1001 from the control circuit 321. The output of the threshold determining circuit 319 is supplied to the clock terminal of the latch circuit 1001 to hold the offset amount read from the RAM 316 when the correlation output becomes equal to or greater than a predetermined level. The output of the latch circuit 1001 is supplied to an error signal generator 1002 which generates a signal for compensation of the frequency offset in the units of fs. The output of the error signal generator 1002 is sent out as a frequency offset signal via a latch circuit 1003.

An offset signal detection timing signal is connected via an AND gate 1005 to the clock terminal of the latch circuit 1003 from the control circuit 321, so that the offset signal is latched at a predetermined timing.

A reset signal form the control circuit 321 and the output of the threshold determining circuit 319 are respectively input to the reset terminal and set terminal of an RS flip-flop circuit 1004 whose output is supplied to the AND gate 1005. The output of the RS flip-flop circuit 1004 is reset to "0" at the head of a transmission frame and is set to "1" when the correlation output becomes equal to or greater than a predetermined level. When no correlation peak is detected, the output of the RS flip-flop circuit 1004 stays "0" so that the output of the AND gate 1005 becomes "0." When a correlation peak cannot be detected due to the interference of impulse noise or the like on the frequency reference symbol, therefore, offset data is not latched in the latch circuit 1003. A power-on reset signal is supplied to the clear terminal of the latch circuit 1003 so that the frequency offset data is cleared to "0" until the first correlation peak is detected.

Because each carrier carries a QPSK symbol in the frequency reference symbol shown in FIG. 3, independent data other than the main data can be transferred using this QPSK symbol.

Figure 15:
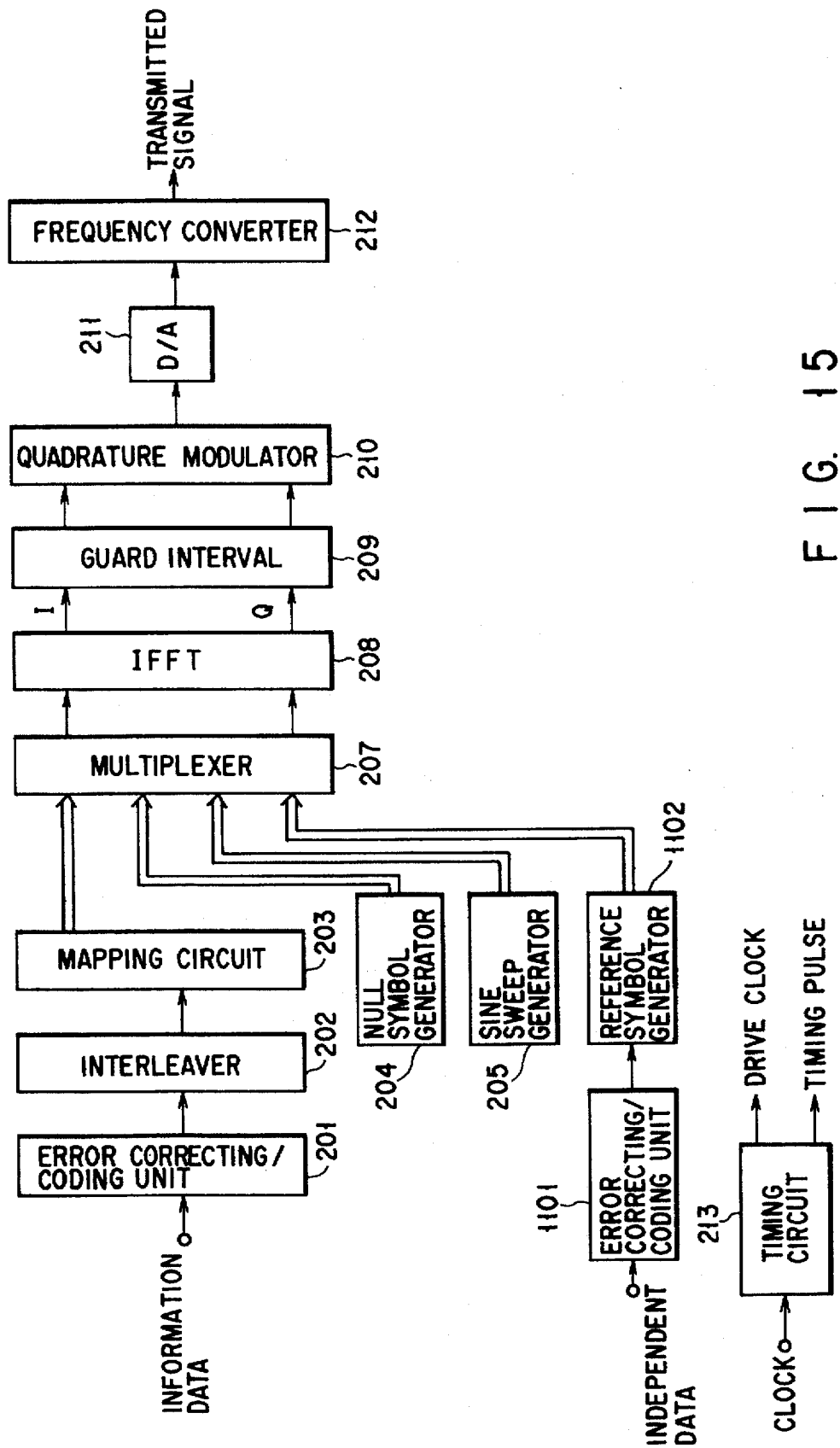
FIG. 15 is a diagram showing another embodiment of an OFDM transmitting apparatus according to this invention.

FIG. 15 shows one embodiment of an OFDM transmitting apparatus which transfers independent data by a frequency reference symbol.

To avoid the redundant description, like or same reference numeral are given to those components in FIG. 15 which are the same as the corresponding components in FIG. 4. Referring to FIG. 15, independent data is coded by a error correcting/coding unit 1101, and the corrected/coded signal is input to a reference symbol generator 1102. An output of the reference symbol generator 1102 is multiplexed and transferred by the multiplexer 207. According to this system, existing carriers are effectively used, and since the existing carriers carry QPSK data, the data transfer efficiency can be improved.

Figure 16:
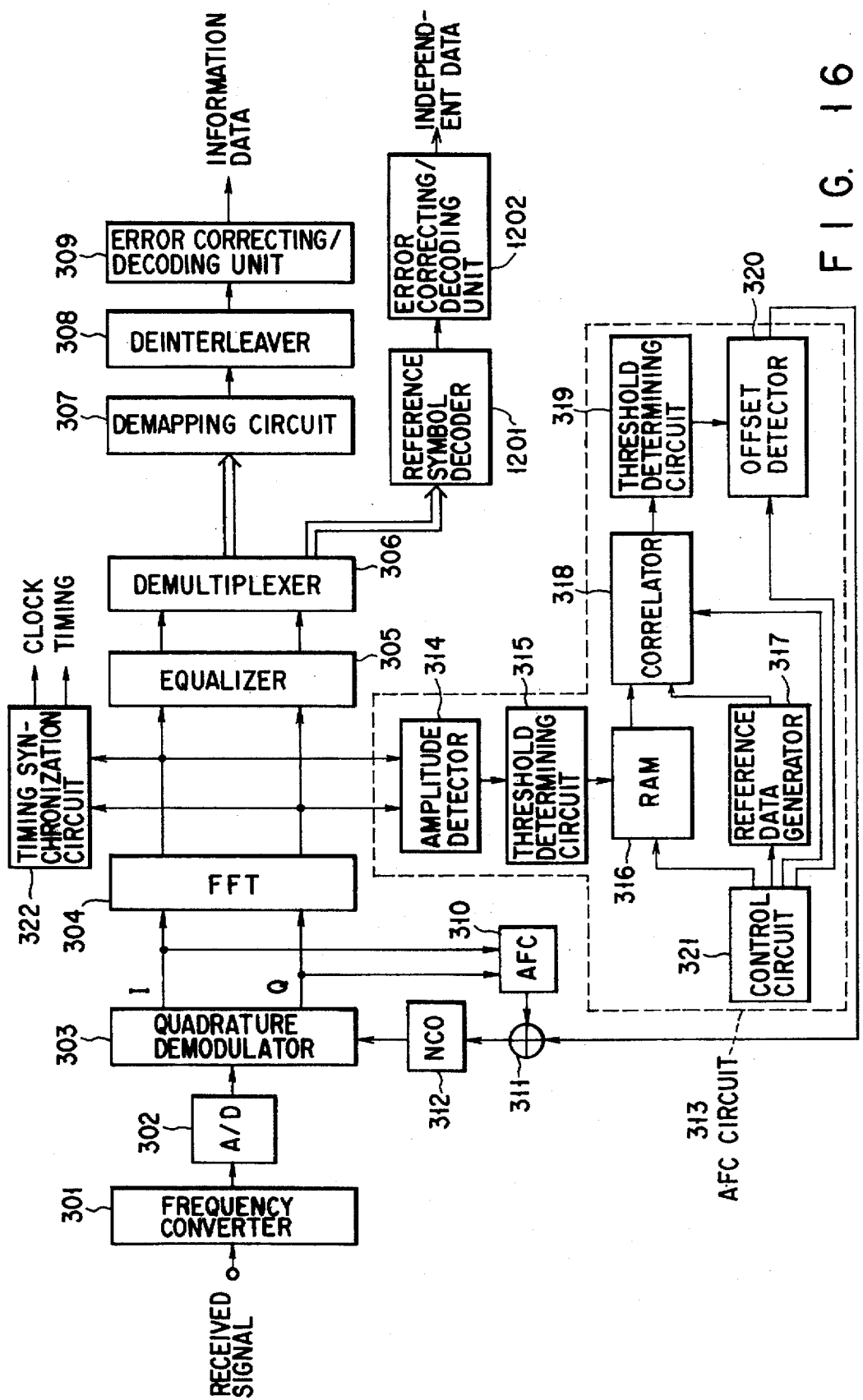
FIG. 16 is a diagram showing another embodiment of an OFDM receiving apparatus according to this invention.

FIG. 16 shows one embodiment of an OFDM receiving apparatus corresponding to the OFDM transmitting apparatus shown in FIG. 15.

To avoid the redundant description, like or same reference numeral are given to those components in FIG. 16 which are the same as the corresponding components in FIG. 5. Referring to FIG. 16, a demodulated frequency reference symbol is separated by a demultiplexer 306 and is input to a reference symbol decoder 1201. The reference symbol decoder 1201 decodes, for example, a QPSK symbol in the frequency reference symbol. The output of the reference symbol decoder 1201 is decoded by an error correcting/ decoding unit 1202 to be output as independent data.

In the frequency reference symbol shown in FIG. 3, a plurality of carrier arrangement patterns may be prepared so that independent data other than information symbols can be transferred in association with the carrier arrangement patterns. According to this system, the carrier arrangement patterns themselves represent the contents of data.

Figure 17:
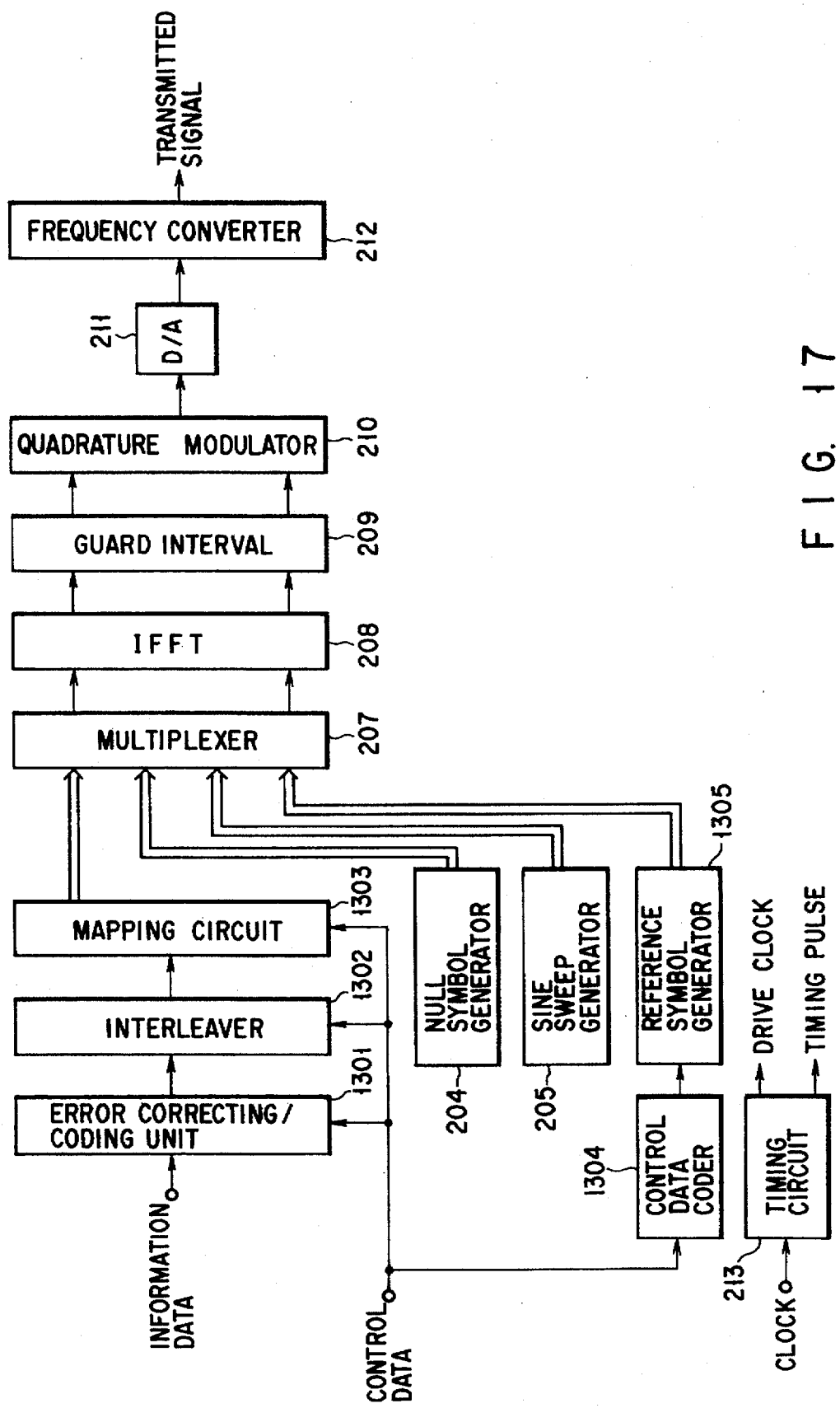
FIG. 17 is a diagram showing a further embodiment of an OFDM transmitting apparatus according to this invention.

FIG. 17 shows one embodiment of an OFDM transmitting apparatus which transfers operation parameters as independent data by the frequency reference symbol that has a plurality of carrier arrangement patterns. More specifically, FIG. 17 exemplifies an apparatus which transfers operation parameter information of the error correcting section, interleaving section and mapping section as independent data. In FIG. 17, an error correcting/coding unit 1301, an interleaver 1302 and a mapping circuit 1303 are designed to change their operation parameters based on control data. The parameters of the individual sections include the redundancy of an error correcting code, the depth of interleaving and the modulation scheme for the individual carriers. By altering those parameters, the system can be optimized flexibly in accordance with the contents of main data and the transfer conditions. The control data is encoded by a control data coder 1304 and is then supplied to a reference symbol generator 1305. The reference symbol generator 1305 generates a frequency reference symbol of a predetermined pattern from among a plurality of patterns in accordance with input data. The output of the reference symbol generator 1305 is multiplexed by a multiplexer 207 before transmission.

Figure 18:
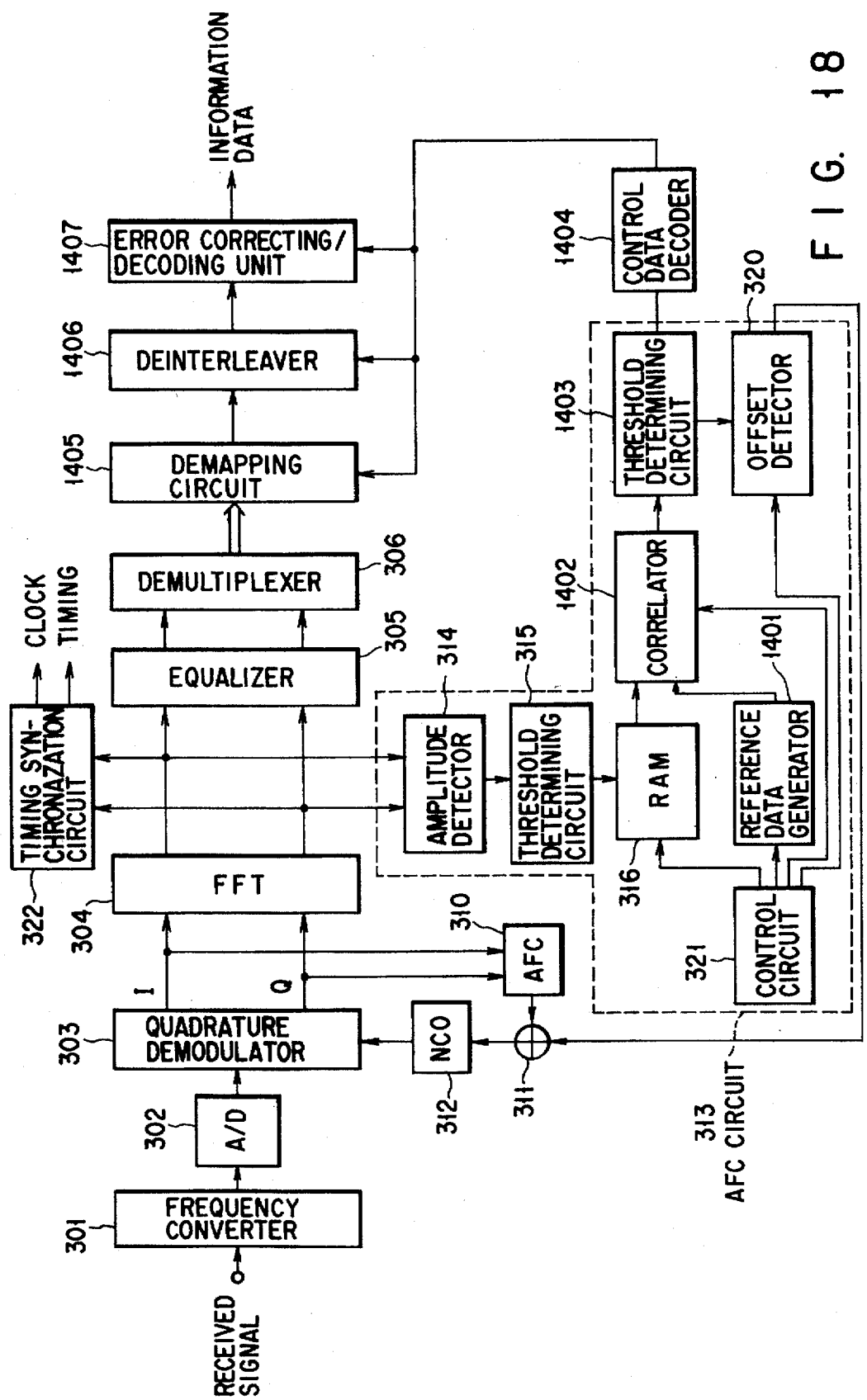
FIG. 18 is a diagram showing a further embodiment of an OFDM receiving apparatus according to this invention.

FIG. 18 exemplifies an OFDM receiving apparatus which is associated with the OFDM transmitting apparatus that transfer the operation parameters as independent data and which restores independent data. To avoid the redundant description, like or same reference numeral are given to those components in FIG. 18 which are the same as the corresponding components of the receiving apparatus in FIG. 5. A reference data generator 1401 generates a plurality of PN sequences to be used on the transmission side. A correlator 1402 detects the correlations between a reception pattern and a plurality of patterns. A threshold determining circuit 1403 compares each input correlation value with a predetermined level, determines that a pattern whose correlation value becomes equal to or greater than a predetermined level is the transmitted pattern, and outputs a signal indicative of the carrier arrangement pattern of the frequency reference symbol to a control data decoder 1404. The control data decoder 1404 decodes parameter control data in accordance with the carrier arrangement pattern of the frequency reference symbol. The output of the control data decoder 1404 is supplied to a demapping circuit 1405, a deinterleaver 1406 and an error correcting/decoding unit 1407. Accordingly, the parameters of the individual sections can be altered in accordance with the parameters on the transmission side.

In sort, this invention can widen the frequency acquisition range and can improve the resistance to multipath interference. This invention can also improve the data transfer efficiency.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An orthogonal frequency division multiplexing (OFDM) transmission/reception system comprising:

transmission means for:
setting some or all of a plurality of equidistant carrier positions as reference carrier positions;
assigning actual transmitted carriers on those of said reference carrier positions which are located in a predetermined non-equidistant pattern to yield an OFDM symbol; and
periodically transmitting said OFDM symbol as frequency reference symbols; and receiver means for:
detecting said frequency reference symbols as a carrier reception pattern by detecting whether carriers exist or not at said reference carrier positions;
detecting a carrier frequency offset based on a difference between said reception pattern and a transmission pattern; and compensating for frequencies of carriers in accordance with said carrier frequency offset.

2. The OFDM transmission/reception system according to claim 1, wherein an arrangement pattern of said transmitted carriers on said reference carrier positions is based on a pseudo noise (PN) sequence.

3. The OFDM transmission/reception system according to claim 1, wherein modulation of said transmitted carriers on said reference carrier positions is a phase shift keying (PSK).

4. The OFDM transmission/reception system according to claim 1, wherein on said transmission side, independent data is PSK coded and is assigned to said transmitted carriers as said frequency reference symbols in transmission; and on said reception side, said frequency reference symbols are PSK decoded to restore said independent data.

5. The OFDM transmission/reception system according to claim 1, wherein on said transmission side, a plurality of carrier arrangement patterns of different phases are prepared as said frequency reference symbols, and independent data is assigned to said plurality of carrier arrangement patterns; and on said reception side, a pattern of said frequency reference symbols is detected, and said independent data is identified from said detected pattern.

6. An OFDM transmitting apparatus comprising:

reference symbol generating means for generating data for frequency reference symbols corresponding to non-equidistant positions among carrier positions assigned at equidistances along a frequency axis;

multiplexing means for multiplexing at least data for said frequency reference symbols and data for a main information symbol;

OFDM modulation means for performing OFDM modulation on a plurality of carriers with an output of said multiplexing means; and quadrature modulation means for performing quadrature modulation on an output of said OFDM modulation means.

7. The OFDM transmitting apparatus according to claim 6, wherein said reference symbol generating means generates data for said frequency reference symbols in a PN sequence pattern.

8. The OFDM transmitting apparatus according to claim 6, wherein said reference symbol generating means generates PSK codes as data for said frequency reference symbols.

9. The OFDM transmitting apparatus according to claim 6, wherein said reference symbol generating means performs PSK coding on independent data different from data for said main information symbol to acquire PSK symbol data and arranges said PSK symbol data on a predetermined pattern non-equidistant along said frequency axis to thereby generate data for said frequency reference symbols.

10. The OFDM transmitting apparatus according to claim 6, wherein said reference symbol generating means associates independent data different from data for said main information symbol with a predetermined pattern in a plurality of patterns using said plurality of carriers, and shares data for said frequency reference symbols and said independent data.

11. An OFDM receiving apparatus comprising:

carrier generating means for generating carriers;

quadrature demodulation means for receiving an OFDM modulation wave including a frequency reference symbol and performing quadrature demodulation of said OFDM modulation wave with the output of said carrier generating means;

OFDM demodulation means for performing OFDM demodulation using an output of said quadrature demodulation means;

first frequency control means for detecting a carrier frequency offset using said output of said quadrature demodulation means and supplying a first carrier compensation signal based on said carrier frequency offset to said carrier generating means; and second frequency pattern of transmitted carries using an frequency reference symbol included in an OFDM demodulation output from said OFDM demodulation means, comparing said detected carrier arrangement pattern with a predetermined carrier arrangement pattern to detect a carrier frequency offset and supplying a second carrier compensation signal based on that frequency offset to said carrier generating means.

12. The OFDM receiving apparatus according to claim 11, wherein said second frequency control means includes:

amplitude detection means for detecting amplitudes of said frequency reference symbols;

determining means for detecting a reception pattern which is a carrier arrangement pattern of received frequency reference symbols using amplitude information output from said amplitude detection means;

reference data generating means for generating a reference pattern which is an ideal carrier arrangement pattern of said frequency reference symbols;

correlation detection means for detecting a correlation between said reception pattern from said determining means and said reference data id reference data generating means; and offset detection means for detecting an offset amount between said reference pattern and said reception pattern in accordance with a timing at which a detection output of said correlation detection means becomes equal to or greater than a predetermined level and acquiring said carrier frequency offset based on said offset amount.

13. The OFDM receiving apparatus according to claim 12, wherein said reference data generating means generates said reference pattern based on a predetermined PN sequence.

14. The OFDM receiving apparatus according to claim 11, wherein said frequency reference symbols of said OFDM modulation wave are transferred as PSK symbols using independent data different from data for a main information symbol; and further comprising means for performing PSK decoding of said frequency reference symbols demodulated to decode said independent data.

15. The OFDM receiving apparatus according to claim 11, wherein said frequency reference symbols of said OFDM modulation wave are produced by associating independent data different from data for a main information symbol with a predetermined carrier arrangement pattern in a plurality of patterns obtainable by a plurality of carriers; and further comprising means for determining a carrier arrangement pattern of said frequency reference symbols to decode said independent data.

* * * * *